(12) United States Patent
Ziech et al.

(10) Patent No.: US 6,997,468 B2
(45) Date of Patent: Feb. 14, 2006

(54) CONTROL ROD SUSPENSION WITH OUTBOARD SHOCK

(75) Inventors: James F. Ziech, Kalamazoo, MI (US); Paul Pollock, Mattawan, MI (US)

(73) Assignee: Dana Corporation, Toledo, OH (US)

(*) Notice: Subject to any disclaimer, the term of this patent is extended or adjusted under 35 U.S.C. 154(b) by 226 days.

(21) Appl. No.: 10/614,232

(22) Filed: Jul. 7, 2003

(65) Prior Publication Data

US 2005/0006868 A1   Jan. 13, 2005

(51) Int. Cl.
*B62D 7/18* (2006.01)
(52) U.S. Cl. .................. 280/93.512; 280/124.116; 280/124.128; 280/124.157
(58) Field of Classification Search .......... 280/124.11, 280/124.116, 124.128, 124.157, 93.512; 267/256
See application file for complete search history.

(56) References Cited

U.S. PATENT DOCUMENTS

| | | | |
|---|---|---|---|
| 1,866,167 A * | 7/1932 | Lolley ................ | 188/282.5 |
| 2,304,291 A | 12/1942 | Wahlberg | |
| 2,403,145 A * | 7/1946 | Ulrich ................ | 280/124.139 |
| 2,756,067 A * | 7/1956 | Porsche et al. ...... | 280/124.153 |
| 2,941,817 A | 6/1960 | Benson | |
| 3,512,802 A * | 5/1970 | La Rock, Jr. ........ | 280/407.1 |
| 4,181,323 A * | 1/1980 | Raidel ................ | 280/124.116 |
| 4,262,929 A | 4/1981 | Pierce | |
| 4,662,467 A | 5/1987 | Arai et al. | |
| 4,802,690 A | 2/1989 | Raidel | |
| 4,951,962 A * | 8/1990 | Tomida et al. ........ | 280/124.108 |
| 6,073,946 A | 6/2000 | Richardson | |
| 6,135,470 A | 10/2000 | Dudding | |
| 6,293,570 B1 | 9/2001 | Goltschalk et al. | |
| 6,375,203 B1 * | 4/2002 | Warinner et al. ..... | 280/124.128 |
| 6,866,277 B1 * | 3/2005 | Ziech et al. .......... | 280/124.116 |

FOREIGN PATENT DOCUMENTS

JP   10181322 A  *  7/1998

OTHER PUBLICATIONS

Hendrickson, Airtek Integrated Front Air Suspension and Steer Axle Technology, 2002.
Holen, Peter et al., Aspects on Roll and Bounce Damping for Heavy Vehicles, Nov. 18-20, 2002, Warrendale, PA.
Man, All Part of the Whole, Munich, Germany.
Neway, AS-Series R.V./Bus Air Steer Suspension, 1997, Muskegon, Michigan.

* cited by examiner

*Primary Examiner*—Eric Culbreth
(74) *Attorney, Agent, or Firm*—Marshall & Melhorn LLC

(57) ABSTRACT

A control rod suspension has at least one dampening structure having an outboard end and an inboard end. The inboard end is pivotally mounted to the vehicle frame. The outboard end is pivotally mounted to a king pin. A king pin rotatably connects the knuckle with a steer axle beam.

17 Claims, 6 Drawing Sheets

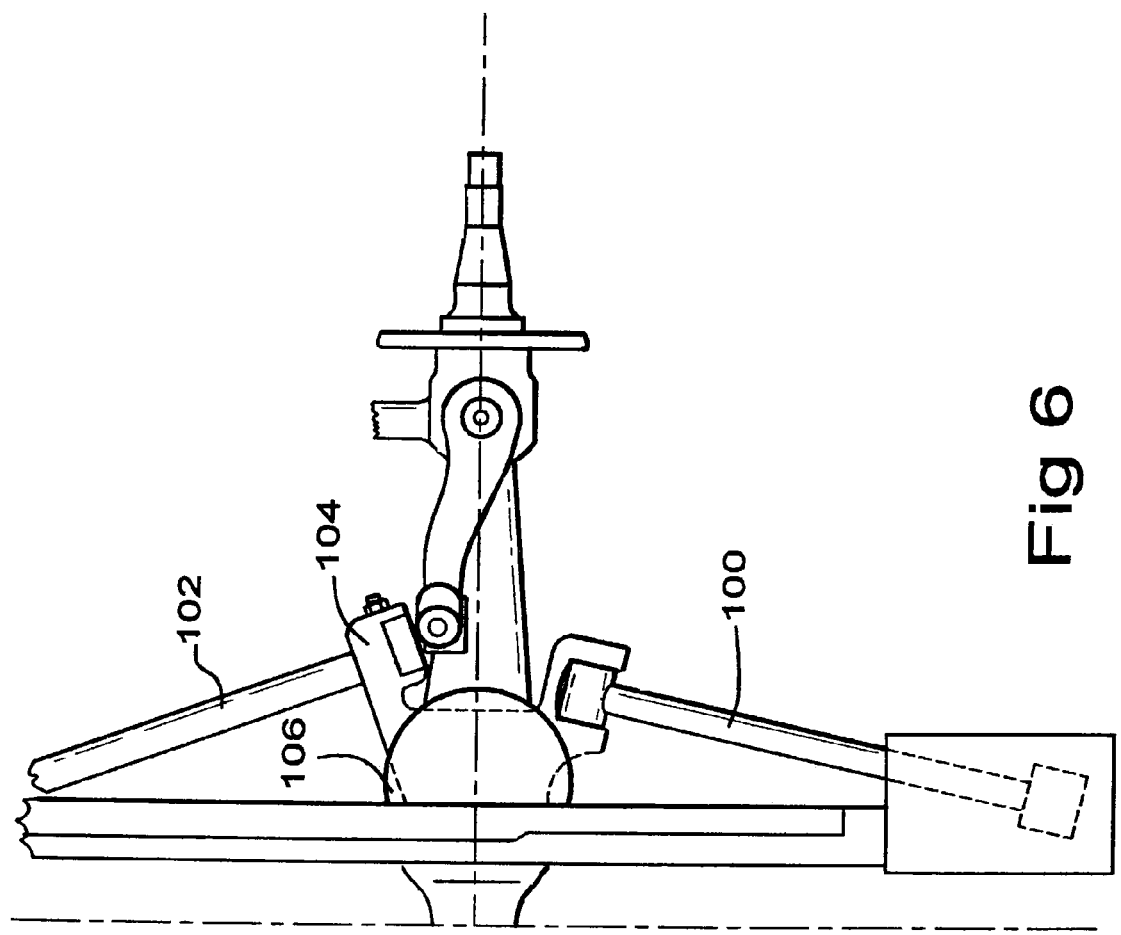

CONTROL ROD SUSPENSION WITH OUTBOARD SHOCK

BACKGROUND OF THE INVENTION

Known shock absorber installations have a similar motion ratio for both roll and vertical wheel movements. Typically, these installations include at least one shock absorber having one end attached to the chassis of the vehicle and the other end attached to the axle of the vehicle.

Examples of known shock absorber installations can be found in for example, U.S. Pat. No. 2,941,817 which provides for a vehicle axle and air suspension assembly. A first end of a shock absorber is attached to an inside portion of a chassis. The second end of the shock absorber is attached to an inside portion of a non-steerable axle.

U.S. Pat. No. 4,262,929 teaches a vehicle suspension for connecting an axle to the frame. The suspension includes both a spring and a shock absorber. The upper end of the shock absorber is mounted to a vehicle frame beam. The lower end of the shock absorber is mounted to the axle.

U.S. Pat. No. 4,802,690 provides for a suspension assembly for a steering axle. The assembly uses a shock absorber attached to both the chassis side rail and a portion of the axle adjacent the air spring.

U.S. Pat. No. 6,073,946 teaches a suspension system for a steerable axle assembly. The system has a shock absorber attached at a first end to the frame of the vehicle and a second end to a plate. The plate is attached to the axle of the vehicle.

U.S. Pat. No. 6,135,470 provides for a wheel axle suspension system having a shock absorber. The shock absorber is attached to the chassis frame member and to an axle seat directly above the axle.

The transient roll dampening characteristics of these known installations need to be improved while not exhibiting overly harsh vertical wheel movements. It has been found in the present invention that by locating at least one dampening structure having an inboard end pivotally mounted to a vehicle frame and an outboard end pivotally mounted to a king pin, that the transient roll dampening characteristics are improved.

SUMMARY OF THE INVENTION

This invention fulfills the above-described needs in the art by providing a control rod suspension with at least one dampening structure having an outboard end and an inboard end. The inboard end is pivotally mounted to the vehicle frame. The outboard end is pivotally mounted to a king pin. A king pin rotatably connects the knuckle with a beam axle. The dampening structure improves the transient roll dampening characteristics of the vehicle.

BRIEF DESCRIPTION OF THE DRAWINGS

The above, as well as other advantages of the present invention, will become readily apparent to those skilled in the art from the following detailed description when considered in the light of the accompanying drawings in which:

FIG. 6 is a side view of yet another construction embodying the present invention.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions directions or other physical characteristics relating to the embodiments disclosed are not to be considered as limiting, unless the claims expressly state otherwise.

Figure 1:
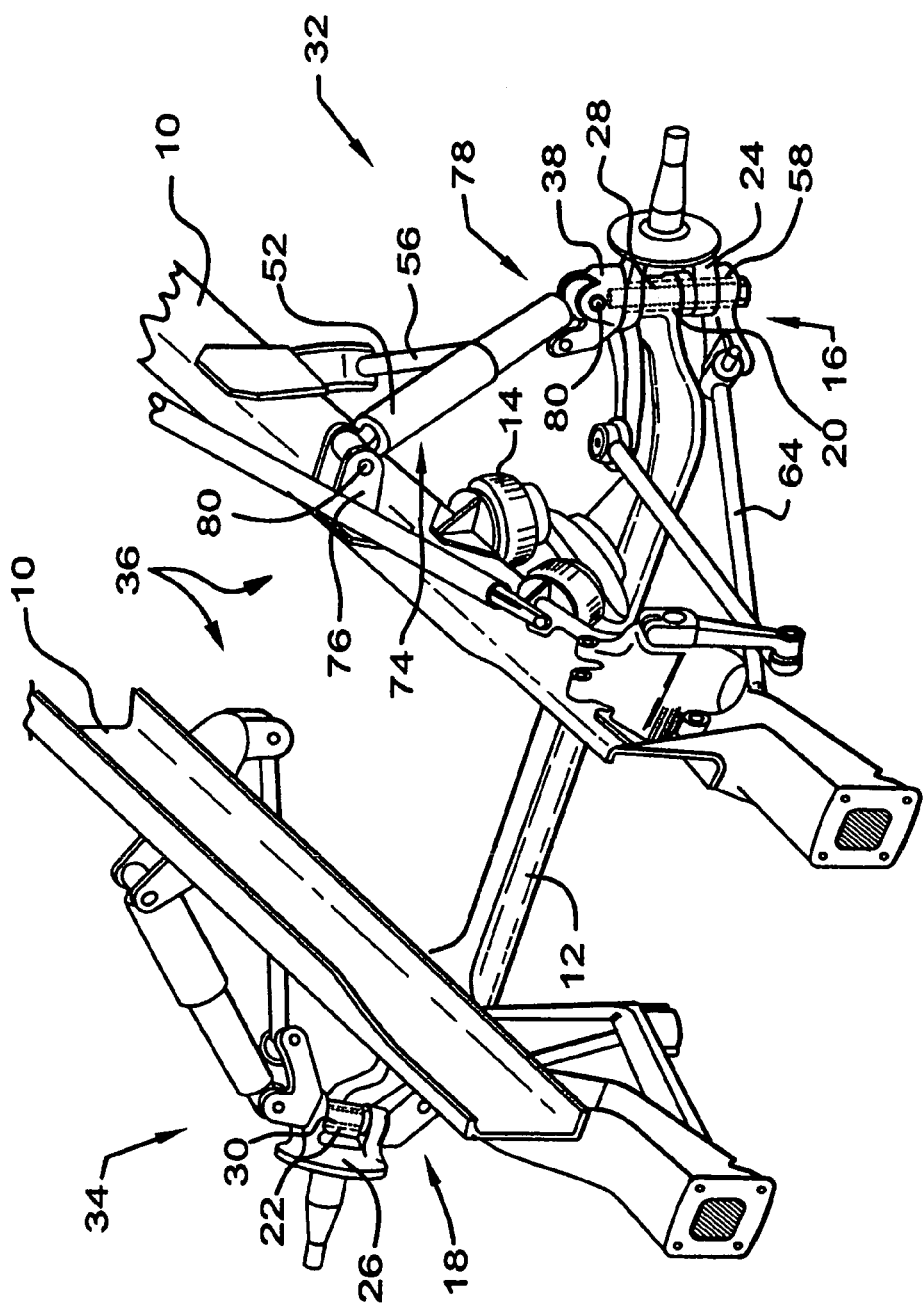
FIG. 1 is a sectional, perspective view of a construction embodying the present invention.

FIG. 1 of the present invention depicts two substantially parallel chassis frame rails 10. The chassis frame rails 10 may be such as, for example, from a Peterbilt® 377 chassis made by Peterbilt Motors Company of Denton, Tex., although those skilled in the art will understand that other chassis frame rails 10 may be used without departing from the scope or spirit of the invention. A steer axle beam 12 is preferably located beneath the chassis frame rails 10. In a preferred embodiment, the steer axle beam 12 is a front steer axle beam 12 such as for example a Dana® Spicer® Steer Axle from the E-1200 W series made by Dana Corporation of Toledo, Ohio, however, the present invention can be used with any axle system. The steer axle beam 12 is connected to the chassis frame rails 10 through devices and methods known by those skilled in the art. One such connecting device is at least one air spring 14. The air spring 14 may be such as a Firestone ITI4F-4 air spring made by Bridgestone Americas Holding, Inc. of Nashville, Tenn., however, other air springs may also be used.

The front steer axle beam 12 has a first end portion 16 and a second end portion 18. Both the first 16 and the second end portions 18 are located outboard from the chassis frame rails 10. End portion 16 has a first cylindrical portion 20 integrally formed therewith. End portion 18 has a second cylindrical portion 22 integrally formed therewith.

A first knuckle 24 and a second knuckle 26 are each rotatably mounted to the first and second cylindrical portions 20 and 22, respectively, of the front steer axle beam 12. Preferably, the first knuckle 24 is mounted by locating a first king pin 28 through both the knuckle 24 and the first cylindrical portion 20 of the front steer axle beam 12. A second king pin 30 similarly mounts the second knuckle 26 to the second cylindrical portion 22 of the front steer axle beam 12. The knuckles 24, 26 may be such as for example a Dana® Spicer® steer knuckle from the E-1200 W series made by Dana Corporation of Toledo, Ohio, however, the present invention can be used with any knuckle.

The following description, for clarity, will describe the remaining portions of the suspension with reference to a first side 32 of the suspension. Unless specified otherwise, a substantially identical complimentary structure is present on a second side 34 of the suspension.

Additionally, this description and the accompanying figures depict a Watts link type suspension 36. It should be understood, however, that the present invention can be used with many types of suspensions including, by way of example only and without limitation, a trailing arm air leaf suspension, a trailing arm suspension and a parallelogram rod suspension.

Figure 2:
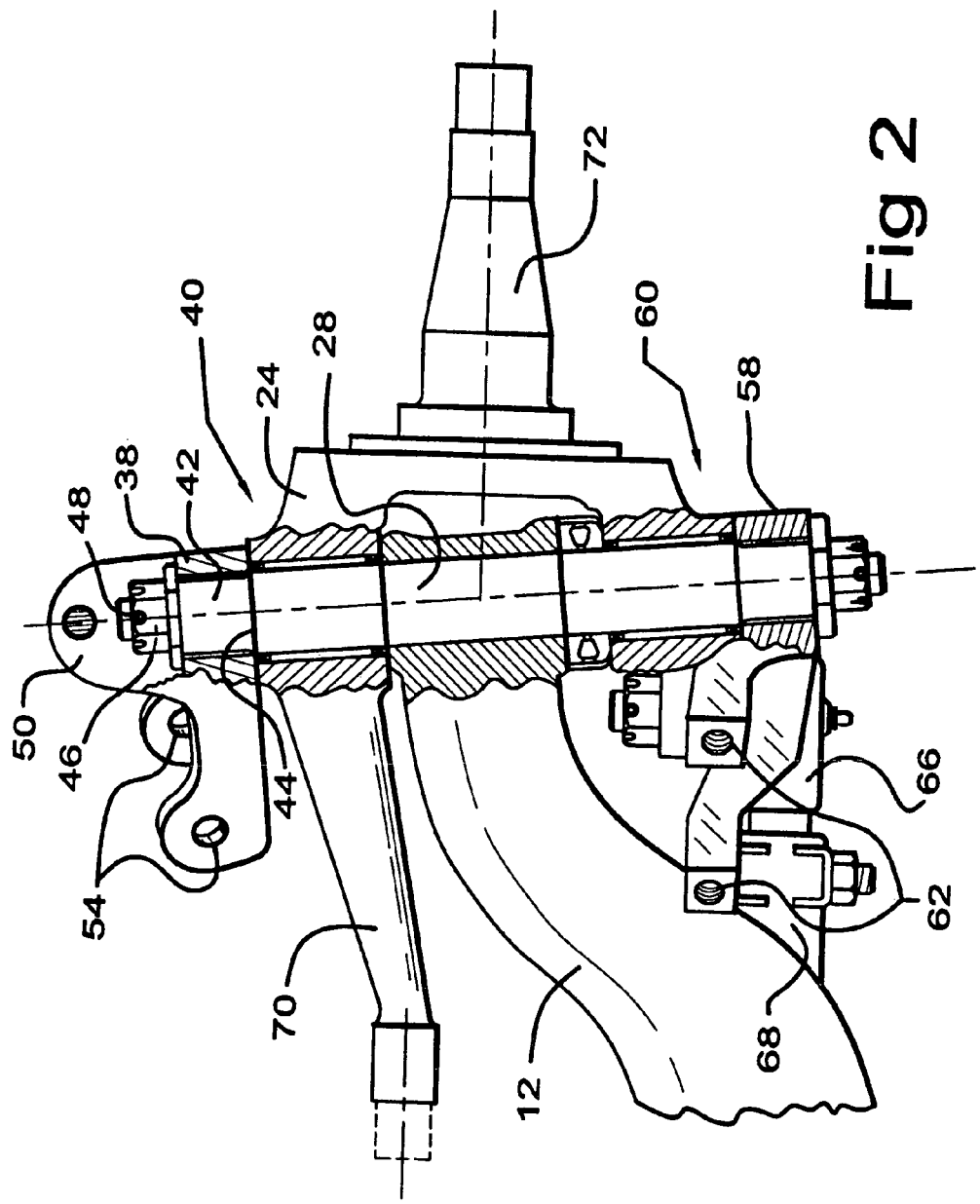
FIG. 2 is a side view of a portion of the invention depicted in FIG. 1.

As best seen in FIG. 2, an upper king pin bracket 38 is located adjacent an upper portion 40 of the knuckle 24. A top portion 42 of the king pin 28 extends upwardly from the knuckle 24 through an aperture 44 in the bracket 38. The top portion 42 of the king pin 28 preferably has a threaded surface 46 for receiving a complimentary threaded nut 48. The nut 48 is located on the king pin 28 and tightened thus connecting the bracket 38 to the king pin 28.

In a preferred embodiment depicted in FIGS. 1 and 2, the upper king pin bracket 38 has an attachment portion 50 for a dampening structure 52 and an attachment portion 54 for a rear suspension linkage 56.

A lower king pin bracket 58 is located adjacent a lower portion 60 of the knuckle 24 in a manner similar to that described for the upper king pin bracket 38. The lower king pin bracket 58 preferably has an attachment portion 62 for a front suspension linkage 64 and an attachment portion 66 for a steering tie rod 68.

A knuckle steer arm 70 is preferably located below the upper king pin bracket 38 and above the steer axle beam 12. Additionally, the knuckle 24 extends in an outboard direction and has a knuckle spindle 72 for receiving a vehicle wheel (not shown), as known by those skilled in the art.

Still referring now to FIGS. 1 and 2, at least one dampening structure 52 is attached to the chassis frame rail 10 and the dampening structure attachment portion 50 of the upper king pin bracket 38. An inboard end 74 of the dampening structure 52 is preferably pivotally mounted to the chassis frame rail 10 with at least one bracket 76. Similarly, an outboard end 78 of the dampening structure 52 is preferably pivotally mounted to the dampening structure attachment portion 50 of the upper king pin bracket 38. Both the inboard 74 and outboard 78 ends of the dampening structure 52 are attached to their respective attachment points by any structure which allows the two to pivotally move with respect to one another, such as a pin 80.

The dampening structure 52 may be any device that mechanically connects the chassis and an end portion, 16 or 18, and that dampens a compressive and/or de-compressive force between the chassis and an end portion 16 or 18.

In a preferred embodiment, the dampening structure 52 is a shock absorber as known to those skilled in the art. The shock absorber may be for example, a Monroe Shock absorber manufactured by Tenneco Automotive Company of Monroe, Mich. Those skilled in the art understand that any type of shock absorber may be used depending upon the desired ride and desired vehicle dynamic roll rate. Additionally, those skilled in the art will appreciate that any viscoelastic member and/or any mechanical member such as, without limitation, air shocks/bags and/or struts and/or shocks and/or springs, can be used as the dampening structure.

Figure 3:
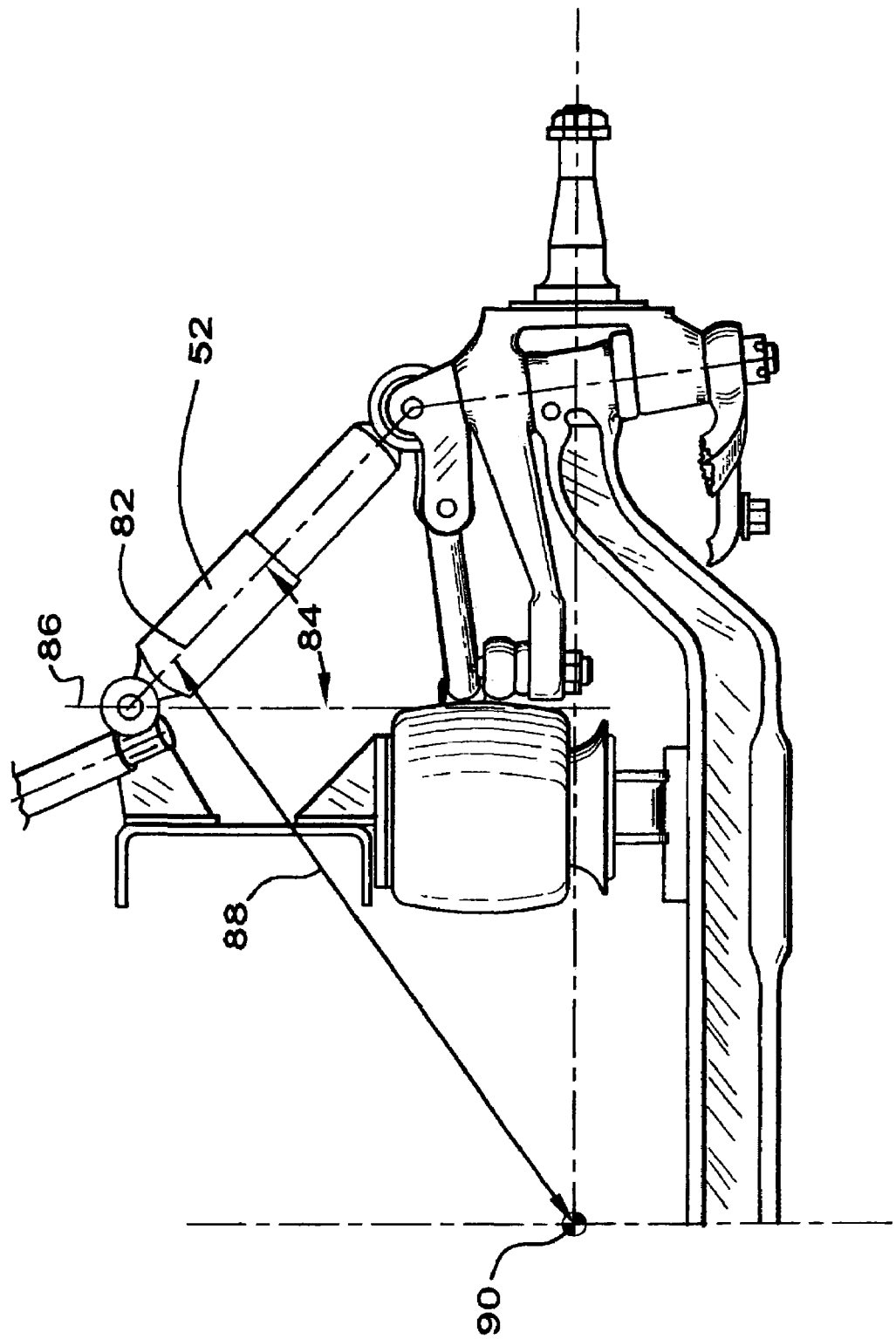
FIG. 3 is a side view of a portion of the invention depicted in FIG. 1.

Preferably, the dampening structure 52 is angled so that a longitudinal centerline 82 of the dampening structure 52 is at an acute angle 84 (i.e., less than ninety degrees) from the vertical 86, as depicted in FIG. 3. In the present embodiment, the vertical 86 is perpendicular to the plane of the supporting surface on which the present invention resides. The exact angle is dependent upon the desired response of the dampening structure 52 to both vertical and roll movements and the stiffness of the dampening structure 52 selected. Thus, for a dampening structure 52 of a given stiffness, mounting the dampening structure 52 at a relatively low angle, such as between zero and approximately twenty degrees, will result in high roll dampening, but reduced vertical dampening. Similarly, mounting that same dampening structure at a relatively high angle, such as between approximately sixty and ninety degrees, will result in high vertical dampening, but reduced roll dampening. Thus, it is preferred that the dampening structure 52 be at an approximate angle of twenty to sixty degrees to have desirable vertical and roll dampening characteristics, although other angles are well within the scope of the present invention.

In a preferred embodiment, the selected angle maximizes the perpendicular distance 88 from the centerline 82 of the dampening structure 52 to a vehicle suspension roll center point 90. The vehicle suspension roll center point 90 is the point about which the vehicle chassis rotates in response to a roll input. The suspension roll center point 90 is alternately defined as the point in the transverse axle plane at which lateral forces may be applied to the chassis without producing suspension roll. Maximizing this distance reduces the vehicle dynamic roll and provides shock absorption in the vertical direction. It is also well within the scope of the present invention to connect the dampening structure 52 to the chassis rail 10 and the portion of the axle beam 12 without concern for maximizing the distance to provide a degree of vehicle dynamic roll reduction and shock absorption.

In a preferred embodiment, a dampening structure 52 having what is characterized by those skilled in the art as a high dampening coefficient is used. The acute installation angle 84 of the dampening structure 52 reduces the effectiveness of the dampening structure 52 in vertical motion, however, the installation angle allows the dampening structure 52 to be effective in roll. Other dampening structures 52, such as for example, air springs can be used to supplement the effectiveness of the suspension in the vertical direction.

Figure 4:
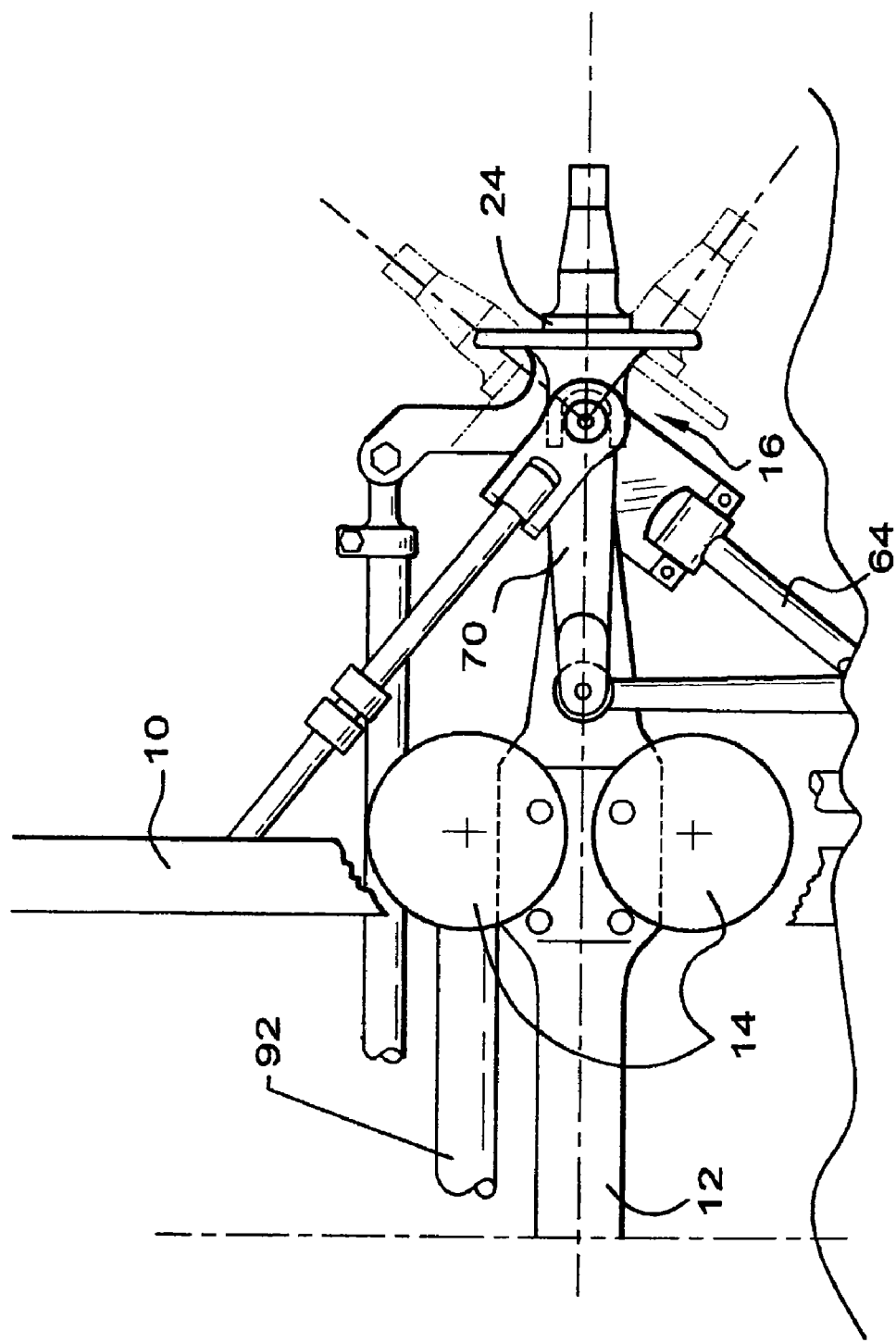
FIG. 4 is a top view of yet another construction embodying the present invention.
Figure 5:
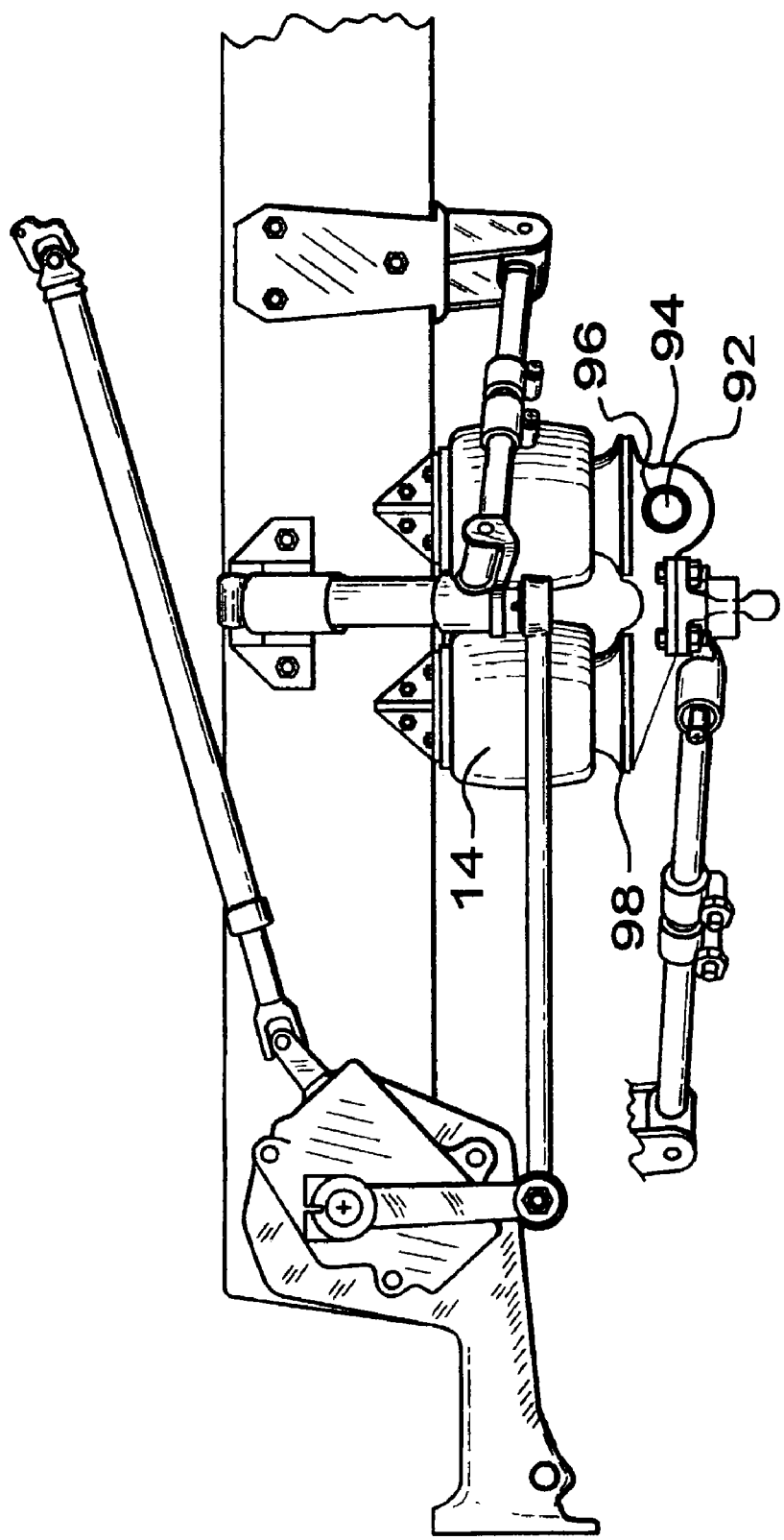
FIG. 5 is a side view of the construction depicted in FIG. 4.

In an alternative embodiment depicted in FIGS. 4 and 5, each of the above described components can be seen in addition to a torsion tube 92. The torsion tube 92 resists, or prevents, twisting of the steer axle beam 12 during roll.

A bracket 94, having an aperture 96 for the torsion tube 92, is attached to a steer axle beam spring pad 98. The bracket 94 may be located anywhere on the steer axle beam 12. In a preferred embodiment, the bracket 94 is located under an air spring 14. The aperture 96 accommodates the torsion tube 92 which extends from one end of the steer axle beam 12 to the other end of the steer axle beam 12 where it is received by a substantially identical bracket (not shown).

In yet another embodiment of the present invention depicted in FIG. 6, a suspension, substantially identical to that disclosed above is depicted. The front suspension linkage 100 and the rear suspension linkage 102, however, are attached to a suspension bracket 104. Preferably, the suspension bracket 104 is of a one-piece construction, however, the bracket 104 may be of a multi-piece construction without departing from the scope of the invention. The suspension bracket 104 connects both linkages 100, 102 to the steer axle beam 12 and forms the lower seat 106 for an air spring 14. Preferably, the suspension bracket 104 is attached directly to the steer axle beam 12.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A suspension, comprising:
   a vehicle frame;
   at least one dampening structure having an outboard end and an inboard end;
   a steer axle beam having an end portion; and
   a king pin connecting a knuckle on said end portion of said steer axle beam;
   wherein said inboard end of said at least one dampening structure is pivotally mounted to said frame and said outboard end of said at least one dampening structure is pivotally mounted to an upper king pin bracket, said upper king bracket comprising a rear suspension linkage attachment portion.

2. The suspension of claim 1, wherein said dampening structure reduces transient roll of said vehicle frame.

3. The suspension of claim 1, wherein said vehicle frame comprises at least one chassis frame rail.

4. The suspension of claim 1, wherein said at least one dampening structure is a shock absorber.

5. The suspension of claim 1, wherein said knuckle comprises a knuckle steer arm.

6. The suspension of claim 1, wherein said knuckle comprises a knuckle spindle.

7. The suspension of claim 1, wherein a suspension bracket is attached to said axle beam, said bracket connected to a front and a rear suspension linkage.

8. The suspension of claim 1, wherein at least one torsion tube is connected to said steer axle beam.

9. The suspension of claim 1, wherein at least one air spring connects said vehicle frame with said steer axle beam.

10. The suspension of claim 1, wherein said king pin connects said upper king pin bracket, and a lower king pin bracket and said knuckle with said steer axle beam.

11. The suspension of claim 10, wherein said upper king pin bracket comprises a dampening structure attachment portion.

12. The suspension of claim 10, wherein said lower king pin bracket comprises a front suspension linkage attachment portion.

13. The suspension of claim 11, wherein said outboard end of said dampening structure is pivotally attached to said dampening structure attachment portion of said upper king pin bracket.

14. The suspension of claim 1, wherein a longitudinal axis of said dampening structure forms an acute angle with a vertical axis.

15. The suspension of claim 14, wherein said acute angle locates said longitudinal axis of said dampening structure a predetermined perpendicular distance from a suspension roll center point.

16. A suspension, comprising:
   a vehicle frame having at least two substantially parallel chassis frame rails;
   a first dampening structure and at least a second dampening structure each having an outboard end and an inboard end;
   a steer axle beam connecting said at least two substantially parallel chassis frame rails, said steer axle beam having a first end portion and a second end portion; and
   a first king pin connecting a first knuckle with said first end portion of said steer axle beam and a second king pin connecting a second knuckle with said second end portion of said steer axle beam;
   wherein said inboard end of said first dampening structure is pivotally mounted to a first of said chassis frame rails and said outboard end of said first dampening structure is pivotally mounted to a first upper king pin bracket, said first upper king pin bracket comprising a first rear suspension linkage attachment portion and said inboard end of said second dampening structure is pivotally mounted to a second of said chassis frame rails and said outboard end of said second dampening structure is pivotally mounted to a second upper king pin bracket, said second upper king pin bracket comprising a second rear suspension linkage attachment portion.

17. A suspension, comprising:
   a vehicle chassis frame rail;
   at least one shock absorber having an outboard end and an inboard end;
   a steer axle beam having an end portion; and
   a king pin connecting a knuckle with said end portion of said steer axle beam;
   wherein said inboard end of said at least one shock absorber is pivotally mounted to said vehicle chassis frame rail and said outboard end of said at least one shock absorber is pivotally mounted to an upper king pin bracket, said upper king pin bracket comprising a rear suspension linkage attachment portion.

* * * * *